June 26, 1956  R. F. GARVER  2,751,980
INCISING BELTS
Filed May 6, 1952  3 Sheets-Sheet 1

Inventor
Richard F. Garver
By Harold S. Meyer
Atty

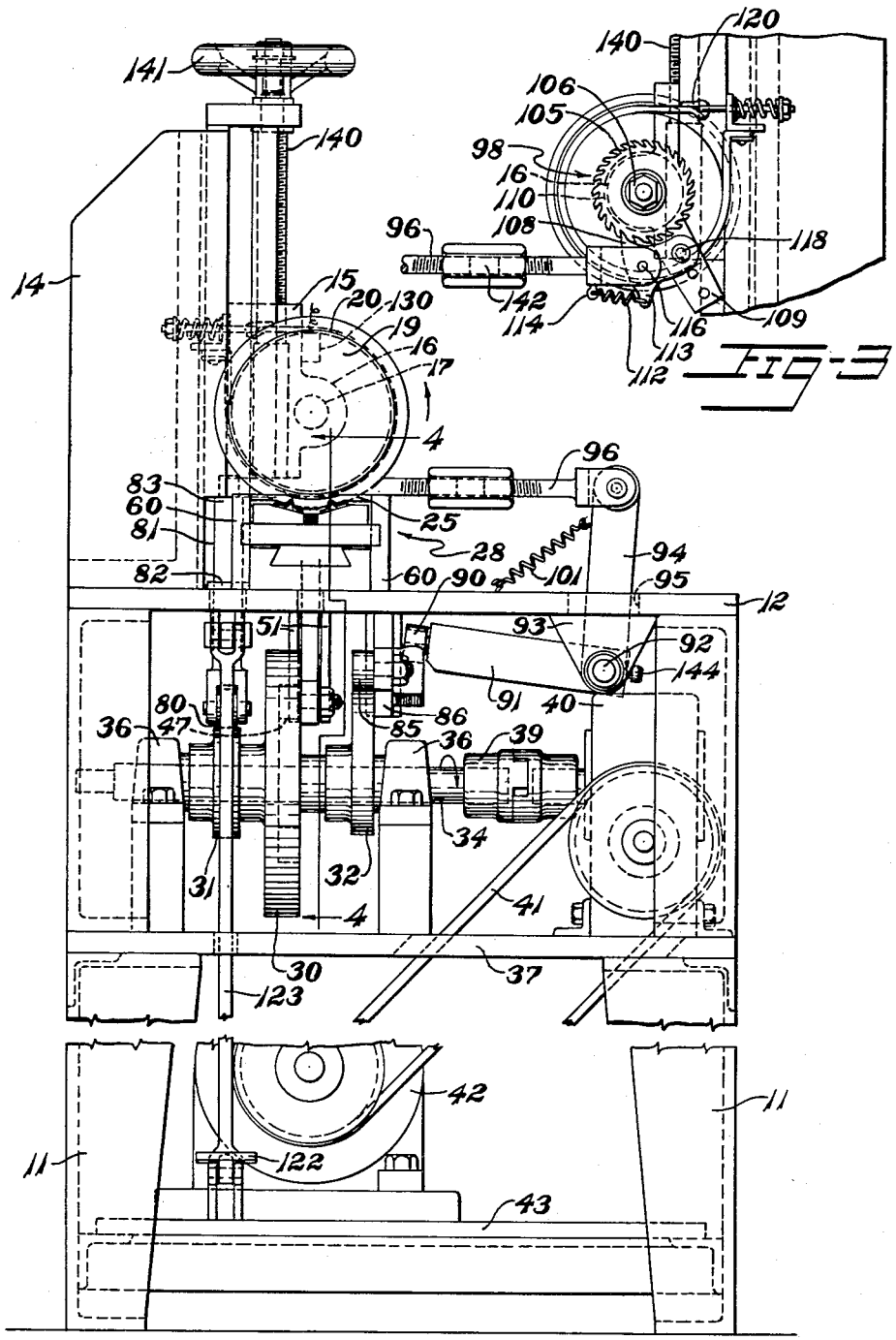

June 26, 1956  R. F. GARVER  2,751,980
INCISING BELTS
Filed May 6, 1952  3 Sheets-Sheet 3
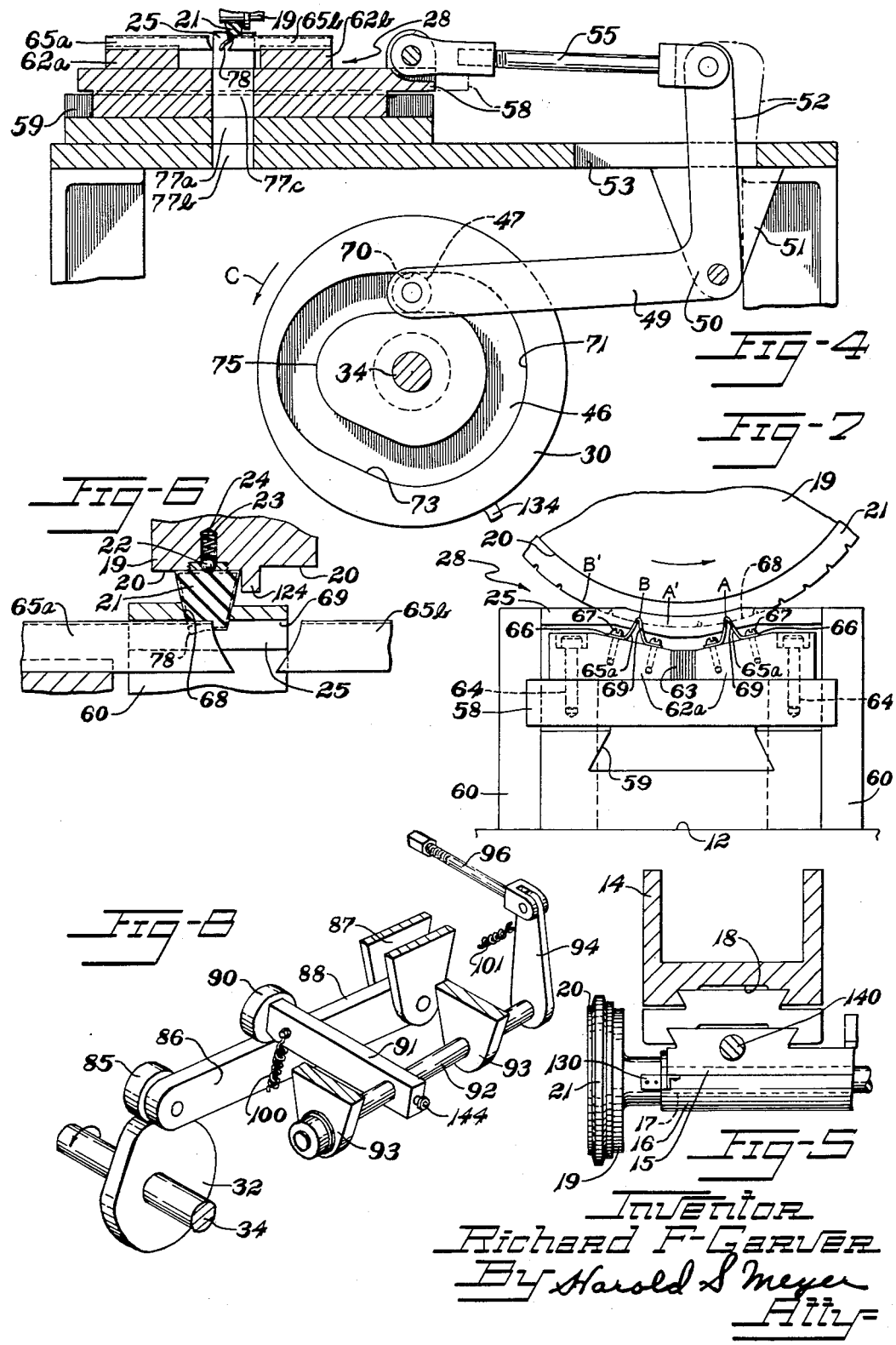
Inventor
Richard F. Garver
By Harold S. Meyer
Atty.

United States Patent Office 2,751,980
Patented June 26, 1956

2,751,980

INCISING BELTS

Richard F. Garver, Akron, Ohio, assignor to The B. F. Goodrich Company, New York, N. Y., a corporation of New York Application May 6, 1952, Serial No. 286,271

9 Claims. (Cl. 164—50)

This invention relates to the manufacture of power-transmission belts such as V-belts and the like. More especially, the invention relates to the operation of forming notches or other incisions across the narrow, sheave contacting side of a V-belt.

The practice of notching a V-belt has been developed to increase the flexibility of the belt without appreciably affecting its tensile strength. The notches are usually formed relatively close together across the layer of elastomeric cushioning material which forms the narrow side of the belt. Thus when the belt is flexed as it is driven around a sheave, compressive stresses in the elastomeric cushion are minimized and distortion of the covering material along the tapered sides of the belt is substantially precluded. Consequently the service life of the belt is prolonged. The present invention advantageously solves various production problems which have been experienced heretofore in notching belts and is particularly suitable for handling relatively short endless belts.

It is an object of this invention to provide for notching belts more rapidly than has been possible heretofore and to provide apparatus which operates automatically and requires a minimum amount of attention from an operator during its operation. Other objects are to provide for spacing the notches or incisions uniformly around an endless belt; to provide for cutting the notches to a uniform depth even though a belt may vary in thickness from place to place; and to provide for conveniently adjusting the apparatus so that it may accommodate belts of different sizes.

These and other objects will be more fully apparent from the following description of the invention in connection with the drawings.

In the drawings:

Fig. 2 is a front elevation of the machine;

Fig. 3 is a view taken along the line 3—3 of Fig. 1;

Fig. 4 is a view taken along the line 4—4 of Fig. 2 and drawn to an enlarged scale;

Fig. 5 is a cross-sectional view taken along the line 5—5 of Fig. 1;

Fig. 6 is a view showing the position of the notch-cutting knives during one phase of the notch-cutting operation;

Fig. 7 is a view taken along the line 7—7 of Fig. 1 and drawn to an enlarged scale; and Fig. 8 is a perspective view showing a portion of a mechanism for spacing the notches.

Figure 1:
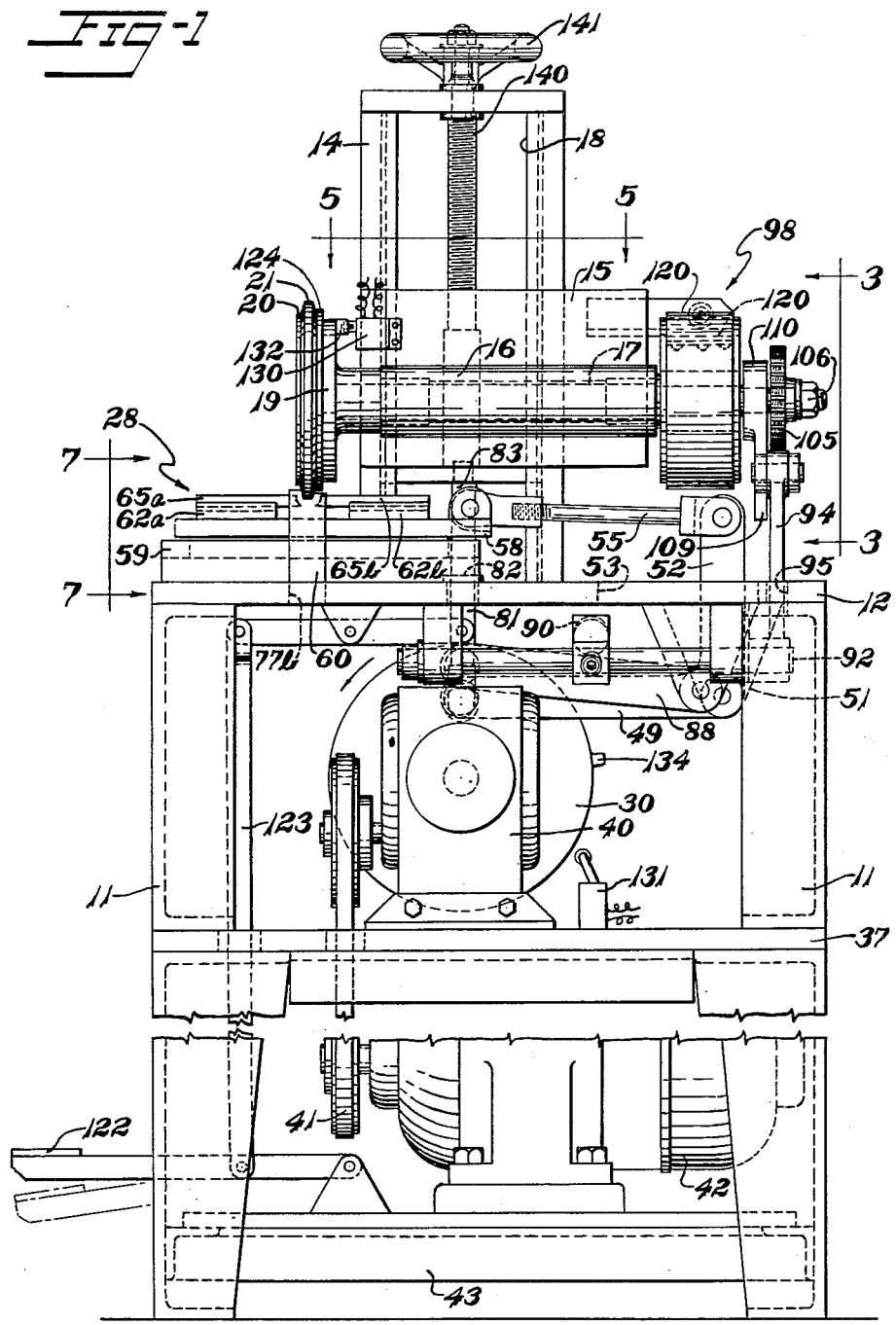
Fig. 1 is a side elevation of a machine constructed according to and embodying the principles of this invention.

The machine illustrated in the drawings is particularly adapted for notching relatively short, endless V-belts. As shown in Figs. 1 and 2, it is formed with a frame which includes four upright members 11 to support the corners of a flat, rectangular cover plate 12. At the left side of the cover plate 12 (the left in Fig. 2) there is an upstanding bracket 14 for supporting a head 15 having a horizontal journal 16 in which a horizontal shaft 17 is rotatably mounted. The bracket 14 has a vertical dove-tail guideway 18 in which the head 15 is vertically slidable (see Fig. 5) toward and away from the cover plate 12. The head 15 is freely slidable in the guideway 18 and normally the head is in a position toward the bottom of the guideway 18 due to the weight of the head, the journal 16, etc.

The shaft 17 extends from the front of the machine (the left side of Fig. 1) through the journal 16 to the rear of the machine and to the front end of this shaft there is fastened a mandrel 19 which supports the V-belts to be notched in the machine. This mandrel is a relatively thin, circular disc which is mounted in a vertical plane and has a narrow, peripheral surface 20 (Fig. 6) around which a V-belt such as belt 21 to be notched is fitted in an inverted or inside-out position, i. e. with the wide side of the belt on the surface 20 and the narrow side of the belt projecting away from the surface 20. In the periphery of the mandrel 19 there are a plurality of small pressure balls 22 which are mounted so that each ball element projects slightly above the peripheral surface of the mandrel. One of these elements is shown in Fig. 6. The ball 22 is rotatably retained in a housing 23 and the ball is urged toward the top of the housing by a spring 24. The balls are adapted to rotate somewhat to facilitate the placing of the belt 21 on the mandrel and after the belt is in position the springs 24 will urge the balls outwardly against the belt to tension the belt and hold it rigidly. Various types of mandrels may be used which are expansible to apply tension to the belt while it is being notched.

During the operation of the machine the mandrel holds the portion of the belt around the bottom of the mandrel in an anvil 25 located below the mandrel on the cover plate 12 and notches are cut through this portion of the belt in the anvil by a knife mechanism 28 which is mounted on the cover plate under the mandrel. The anvil 25 supports the full weight of the head 15, the mandrel 19 and the shaft 17, etc. so that the length of the V-belt around the bottom of the mandrel is pressed firmly against the anvil while the knife mechanism is in operation. The knife mechanism 28 operates intermittently to cut notches in the portion of the belt in the anvil, and between successive cutting movements of the knife mechanism 28, the mandrel is indexed by mechanisms described hereinafter to bring successive portions of the belt into contact with the anvil. In the first phase of this indexing movement the mandrel is raised away from the anvil by sliding head 15 upwardly in the guideway 18 of bracket 14. Then the shaft 17 is rotated to turn the mandrel so that the V-belt on the mandrel is advanced endwise relative to the knife mechanism to bring an unnotched portion of the belt over the anvil. Thereafter the mandrel is lowered to press the V-belt against the anvil in preparation for another notch-cutting movement of the knife mechanism. The knife mechanism and the indexing movement are successively repeated until notches are formed at desired intervals all around the belt.

The knife mechanism 28 and the mechanism for effecting the indexing movement are actuated in proper sequence by three cams 30, 31 and 32 (see Fig. 2). These cams are fastened on a cam shaft 34 which is rotatably supported in a pair of pillow block bearings 36, 36 on a shelf 37 in the frame under the cover plate 12. The cam shaft 34 is connected by a coupling 39 to a gear transmission unit 40 which is mounted on the shelf 37 and which is driven through a belt 41 by a motor 42 supported on cross rails 43 at the bottom of the frame. Once a belt is placed on the mandrel and the machine is started the motor 42 runs steadily and rotates the cam shaft 34 at a constant speed during each notch cutting operation and the succeeding indexing movement until notches are formed at equal intervals around the belt.

The knife mechanism

The cam 30 operates the knife mechanism 28 to perform each notch-cutting movement. This cam 30 is a relatively thick, circular disc with an endless cam groove 46 formed in one vertical face to receive a follower 47 (see Fig. 4). The follower 47 is a small roller which is fastened to a substantially horizontal arm 49 of a bell crank 50 and this crank 50 is pivotally supported by a bracket 51 fastened to the underneath side of cover plate 12 near the rear of the apparatus. Another arm 52 of the bell crank extends perpendicularly upwardly from arm 49 through a slot 53 in the cover plate 12. The upper end of the arm 52 is pivotally connected to a link 55 which extends generally horizontally across the top of the cover plate toward the front of the apparatus. The front end of link 55 is pivotally connected to a member 58 of the knife mechanism which extends under the anvil 25 perpendicularly to the plane of the mandrel and which is horizontally slidable in a dove-tail guideway 59 (Fig. 7) fastened to the cover plate 12. The cam groove 46 is shaped to move the follower 47 alternatingly toward and away from the cam shaft 34 as the cam is rotated. Thus the bell crank 50 is rocked about its supporting pivot in bracket 51 to swing the vertical crank-arm 52 back and forth in the slot 53. Therefore link 55 is reciprocated longitudinally and, in turn, horizontally reciprocates the slidable member 58 in the guideway 59.

The anvil 25 bridges over the guideway 59 substantially intermediate the ends of the guideway and the anvil is supported at its ends by a pair of upright bars 60 which are fastened to the sides of the guideway 59.

On the portion of member 58 shown in Fig. 4 on the left side of the anvil there is fastened a pair of block 62a (see also Fig. 7) and on the portion on the right side of the anvil there is another pair of blocks 62b. The individual blocks in each pair are spaced by shims 63 and each block is fastened for lateral adjustment on the member 58 by a bolt 64. The blocks 62a support a pair of knives 65a on the left side of the anvil and the pair of blocks 62b support a pair of knives 65b on the right side of the anvil. The knives are each positioned with their cutting edges directed toward the anvil and each is oriented on an axis which extends radially relative to the mandrel. The knives of pair 65a are longitudinally aligned with the corresponding knives of pair 65b. Each knife has two outwardly extending flanges 66 (Fig. 7) along its lower edges which flanges fit flat against and are releasably fastened by the cap screws 67 to the block which supports the knife so that the knives may be removed for sharpening. The body of each knife inwardly from the flanges 66 has a cross-sectional shape like an inverted V although along the apex of the V the knife is rounded somewhat. The knives of each pair 65a and 65b are spaced apart a distance of three notches on the belt. This spacing provides for efficient operation of the machine and will be more fully discussed in connection with the description of the indexing mechanism of the machine.

The anvil 25 has in its upper surface an arculately-shaped channel 68 of the same curvature as the V-belt to be notched. The sides of the channel 68 are tapered to correspond to the taper of the sides of the V-belt and the V-belt fits into this channel substantially as shown in Figs. 6 and 7. The bottom of this recess is intersected laterally by the apex corner of two parallel triangular-shaped openings 69 which extend through the lower portion of the anvil in coaxial alignment with each pair of knives. The openings 69 are shaped to receive the knives 65a and 65b, and, as the slidable member 58 is reciprocated, the respective pairs of knives are moved into and out of the openings 69 on opposite sides of the anvil. The portion of the V-belt exposed at the intersection of the triangular openings 69 and the bottom of the channel are cut away by the apex of the knives to form notches in the belt.

The reciprocating motion imparted to the slidable member by the cam 30 is such that, first the knives 65a are urged into the anvil against the tapered side of the V-belt to cut two spaced notches partially through the belt. Then the movement of the slidable member 58 is reversed and the other pair of knives 65b is urged into the opposite side of the anvil against the other tapered side of the V-belt to complete the cut and form two notches spaced through the belt a distance of three notches apart. Forming the notches by cuts directed from opposite sides of the belt is advantageous since the notches are more clearly defined and there is no separation of the covering material from the cushion layer or distortion of other parts of the belt carcass. Because the distance between the bottom of the recess and the cutting edge of the knives is fixed and the V-belt is always pressed against the bottom of the channel 68, the knives will cut notches of uniform depth all around the belt regardless of any irregularities or variations in the thickness of the particular V-belt being notched. As indicated in Fig. 6 the sides of the channel 68 support the tapered side of the V-belt and prevent displacement of the belt on the mandrel while the knives are cutting across the belt.

The movement of the knife mechanism may be more clearly understood by noticing the shape of the cam groove 46 in Fig. 4. This figure shows the relative position of the bell crank 50 and other portions of the linkage when the right knives 65b have just finished their leftward stroke to complete the notches originally started by the knives 65a. In this figure the follower 47 is at point 70 in the groove which is the point in the groove closest to the cam shaft 34. Assuming the rotation of the cam to be counter-clockwise in this view (see the arrow) the follower will next be contacted by a portion between point 70 and a portion 71 of the groove which will move the follower upward from cam shaft 34 and thereby cause the slidable member 58 to move the knives 65a and 65b toward the right into a neutral position on either side of the V-belt. Thereafter along the portion 71 the cam groove 46 is concentric with the cam shaft 34 to provide a dwelling period for the follower 47 during which the slidable member 58 and the knives 65a and 65b are held stationary in their neutral positon.

During the dwelling period the indexing movement of the mandrel (described more fully hereinafter) occurs due to the action of cams 31 and 32 which are also rotated by the cam shaft 34.

After the mandrel is indexed to bring another portion of the belt a portion 73 of the cam groove 46 leading from the concentric portion 71 of the groove away from the cam shaft 34 comes into contact with the follower. This groove portion 73 raises the follower and rocks the bell crank 50 upwardly to urge the left knives 65a against the left side of the V-belt. The left knives cut about half way through the belt as shown in Fig. 6 and in this position the follower is located approximately at point 75 in the cam groove. Thereafter, as the cam 30 completes one revolution, the portion of the groove between point 75 and point 70 moves the follower downwardly toward the cam shaft 34 to urge the right knives 65b against the right side of the belt to complete the cut and return the mechanism to the position shown in Fig. 4.

The guideway 59 is formed with an opening 77a through its center portion under anvil 25 and the guideway is fastened to the cover plate 12 over another opening 77b through the cover plate. The center portion of the anvil under the triangular openings 69 is hollow and, in the center of the slidable member 58 there is an opening 77c. When the slidable member is in the position shown in Fig. 4 all of these openings 77 are in register with each other to form a chute through which the slugs 78 cut from the belt may drop into a suitable receiver (not shown) where they may be eventually salvaged.

The indexing movement

The step of raising the head 15 in the vertical guideway 18 is controlled by cam 31 having a follower 80 (Fig. 2) which rolls on the peripheral surface of the cam. The follower 80 is fastened to the bottom of a push-rod 81 which extends upwardly from the follower through a bushing 82 in the cover plate and which has an upper end 83 in contact with the head 15. The cam 31 is shaped and located on the cam shaft to urge the push-rod 81 upwardly against the head to raise the head 15 away from the anvil 25 during the interval in which the knives are in their neutral position.

While the head 15 is raised in the guideway, cam 32 actuates the rotation of the shaft 17 to turn the mandrel and bring another portion of the belt into position above the anvil. Details of mechanism for this purpose, including cam 32, are shown in Figs. 3 and 8. Referring to Fig. 8, the cam 32 is a plate cam having a peripheral surface on which a follower 85 is adapted to roll as the cam is rotated by cam shaft 34. The follower 85 is rotatably mounted at the end of a long bar 86 which is pivotally supported by a bracket 87 located on the underside of the cover plate near the back of the machine. As the cam 32 rotates, the bar 86 is rocked in a vertical plane about its pivot in bracket 87. The bar 86 has a flat upper surface 88 which supports a roller 90 on the free end of a short rocker arm 91. The other end of the rocker arm 91 is fastened to a short, horizontal rock shaft 92 which is parallel to bar 86 and the side of the machine and which is journaled between two supporting brackets 93 extending downwardly from the cover plate 12. The end of the rock shaft toward the rear of the machine projects through its journal bracket 93, and, fixed to this end is a link 94 which extends upwardly through a slot 95 (Fig. 2) in the cover plate 12. The upper end of this link is pivotally connected to an arm 96 which extends horizontally across the top of the cover plate along the back of the machine toward the shaft 17 to operate a ratchet-and-pawl mechanism 98 (Fig. 3) on the rearward end of the shaft 17. The rocker arm 91 converts the vertical movement of the arm 86 into horizontal reciprocating motion in the horizontal arm 96. As the arm 86 is periodically moved up and down by the cam 32 the rocker arm 91 will also be moved up and down to rotate the short rock-shaft 92. The rotation of the rock-shaft swings the vertical arm 94 forwardly and backwardly in the slot 95, thereby moving the horizontal arm 96 in an intermittent reciprocating motion. A short tension coil spring 100 is hooked onto the rock arm 91 and stretched to any convenient portion of the frame to keep the follower 90 in contact with the surface 88 of bar 86. Another tension coil spring 101 is also stretched between link 94 and cover plate 12 to urge the link 94 toward the front of its slot 95 in the cover plate.

Fig. 3 shows the forward end of arm 96 engaged with the ratchet mechanism 98. This mechanism includes a ratchet wheel 105 which is fastened on the rearward end of shaft 17 by a bolt 106. Engaged with the teeth of the ratchet wheel 105 is a pawl 108 which is pivotally fastened to an arm 109 extending downwardly from a collar 110 (see Fig. 1) which fits around shaft 17 just inside the ratchet wheel. The pawl 108 is also pivotally connected to the end of the horizontal arm 96 and to maintain the pawl in engagement with the teeth of the ratchet wheel there is a short spring 112 which is engaged with a short lug 113 on the bottom of the pawl and which is stretched to another lug 114 on the end of the horizontal arm 96. The pivot 116 which connects the horizontal arm 96 to the pawl is located below the pivot which connects the pivot to the collar arm 109 so that a horizontal movement of the arm 96 toward the shaft 17 will cause the pawl to swing downwardly about the pivot 118 until the engaging end of the pawl becomes engaged with the next succeeding tooth on the ratchet wheel. Thereafter when the horizontal arm 96 is moved away from the shaft 17 the engagement of the pawl with the ratchet wheel 105 rotates the shaft 17 in a clockwise direction (as shown in Fig. 3). The teeth on the ratchet wheel are suitably spaced and the length of arm 96 may be adjusted to turn the shaft 17 through any desired angle. To limit the amount of rotation of the shaft 17 due to the operation of the ratchet, a band brake 120 is provided on the head 15 against the resistance of which the ratchet wheel must operate when it turns the shaft 17 so that the shaft cannot turn more than the desired amount.

In connection with the foregoing discussion of the knife mechanism it was mentioned that the lateral spacing between the knives of each pair 65a and 65b may be adjusted by the shims 63 in Fig. 7. Fig. 7 shows that the knives are spaced by the shims to cut two notches a distance of three notch-spaces apart. The teeth on ratchet wheel 105, however, are pitched so that the mandrel 21, when rotated by the ratchet mechanism, will move the belt endwise a distance of only two notch-spaces after each operation of the knife mechanism. In other words, after notches A and B in Fig. 7 have been cut by the knives, the ratchet will index the mandrel in the direction of the arrow in this figure so that points A' and B' on the belt will be next cut by the knives. Therefore, after the mandrel has been rotated one complete revolution the desired number of notches will have been cut at a spacing equal to one-third the lateral distance between the knives. This system of indexing and spacing the notches has been found to be particularly efficient because after one complete revolution of the mandrel, equally spaced notches are formed all around the belt with the knives cutting on every stroke. The same effect can be obtained if the knives were spaced at exactly the distance desired, but this is not possible since close spacing is required between the notches on the belt and the knives are too big to permit them to be spaced that closely together.

Operation

In operating the machine an operator first places a V-belt which is turned inside out, on the mandrel 21. In order to do this the operator steps on a foot treadle 122 which, through a series of links 123 (see Fig. 1) pivotally mounted on the frame and (see Fig. 1) engaged with the push rod 81, lifts the head 15 upwardly from the anvil independently of the cam 31. On the peripheral surface of the mandrel there is a flange 124 (Fig. 6) to locate the V-belt in the correct position on the mandrel. Then, after the V-belt is slipped around the mandrel, the operator releases the foot treadle 122 so that the head 15 due to its weight drops toward the bottom of the guideway 19 and the mandrel 21 presses the V-belt into the anvil 25. The operator then closes a suitable switch (not shown) to start motor 42 to begin the operation of the machine.

An operating cycle of the machine may be defined as the time required for the knife mechanism to cut through the belt and for the indexing movement to occur, each in the manner described. One operating cycle will occur for each revolution of cam shaft 34. The total number of operating cycles necessary to completely notch a belt will depend on the length of the belt, the notch spacing desired, etc.

At the start of each operating cycle cam 30 will be in contact with its follower 47 at about point 73 while the other cams will be at their dwelling periods. The rotation of cam 30 in the direction of arrow C in Fig. 4 first moves knives 65a against one side of the belt and subsequently moves knives 65b against the other side of the belt to cut away the slugs 78. Immediately after the cutting, the cam 30 dwells while the head lifting cam 31 lifts the push rod 82 to raise the head. At about the time the head is raised, cam 32 moves bar 86 upwardly to initiate the operation of the ratchet mechanism. The ratchet rotates the mandrel through an angular distance equivalent to two notch-spaces on the belt. The head-lifting cam 31 is shaped so that after the mandrel is indexed by the ratchet, the cam 31 will lower the push rod 82 to permit the head to return to its normal position so that the mandrel presses an uncut portion of the belt into the anvil 25. The head-lifting cam 31 and the ratchet-operating cam 32 have a mutually complementary action relative to each other. As the head is returned to normal position, and at about the time cam 30 initiates a subsequent notch-cutting movement of the knives, the ratchet-operating cam 32 moves the bar 86 downwardly to reset the ratchet mechanism for its next movement. Thereafter cams 31 and 32 dwell. The indexing movement is complete when the ratchet is reset and the cams 31 and 32 move into their respective dwelling periods. The movement of cam 30 to operate the knife mechanism to cut notches in the portion of the belt brought into the anvil during the indexing movement is the start of a new operating cycle. The cam shaft 34 rotates steadily and the operating cycle is successively repeated until notches are formed all around the belt.

Automatic control to stop the machine after the belt is completely notched is obtained by two limit switches 130 and 131 (Fig. 1). Limit switch 130 is mounted on the head 15 and is operated by a small lug 132 on the back of the mandrel. The second limit switch 131 is mounted on the shelf 37 and is operated by a lug 134 on the periphery of the cam 30. These two switches are wired in a parallel connection in a circuit with motor 42 so that both switches must be opened to stop the motor 42. Therefore, each time the cam shaft and the cam 30 makes one revolution to complete an operating cycle, the lug 134 on cam 30 opens the lower limit switch 131, but since the upper limit switch 130 is still closed, the power supply circuit to the motor 42 remains uninterrupted and the motor will continue to run, the machine proceeding into another operating cycle. When a sufficient number of operating cycles have occurred to have rotated the mandrel 360° the lug 132 on the mandrel will have been returned to a position to open the upper limit switch 130. At the same instant the cam 30 will have opened the lower limit switch 131 thereby breaking the power supply circuit to the motor 39 and the machine stops.

Ordinarily the V-belts are built and cured in an inverted or inside out position so that this machine by notching the belts in this same position advantageously supplements other production equipment.

An important feature of this machine is that it may be easily adjusted to accommodate V-belts of different sizes. The mandrel 19 is removably mounted on the front end of the shaft 17 and different size mandrels may be substituted therefor. When a mandrel of large or small diameter is assembled on the shaft 17 the elevation of the head 15 in the guideway may be adjusted accordingly by a screw 140 and hand wheel 141 (Figs. 1 and 2) until a V-belt on the mandrel rests properly in the anvil. Normally the head 15 is slideable vertically in the guideway independently of the screw 140.

The anvil 25 is also removably fastened to its supporting members 60 and another anvil having a recess or channel 68 corresponding to the curvature of the new mandrel may be inserted.

Ordinarily it will not be necessary to make any adjustments in the knife mechanism when resetting the machine. However, the position of the knives with respect to the mandrel may be varied somewhat by adjusting the length of link 55 which is formed with a rod having a clevis threaded onto each end of the rod.

The indexing mechanism is advantageously adjustable for different notch spacing by using a ratchet wheel of different size. For large ratchet wheels the pivot 118 of the pawl may be engaged with any one of the lower holes on the collar arm 109 so that the other pawl pivot 116 is always maintained below the pivot 118. The length of arm 96 may be regulated by a turnbuckle connection 142 (Fig. 3). To vary the length of the reciprocating stroke of arm 96 the rocker arm 91 may be moved to different positions along the rock shaft 92 by loosening a small set screw 144 (see Fig. 8) at the end of the rocker arm and then sliding the rocker arm longitudinally along the rock shaft. At different positions of the rocker arm 91 on the rock shaft 92 there will be a proportional change in the vertical distance through which the rocker arm 91 is swung by the bar 86 and, consequently, a corresponding change in the angle through which the link 94 is swung. If the rocker arm is moved toward cam shaft 34 the reciprocating stroke of link 96 will be increased, and if the rocker arm is moved away from the cam shaft 34 the stroke will be shortened.

Variations may be made without departing from the scope of the invention as it is defined in the following claims.

I claim:

1. Apparatus for forming substantially equally spaced, transverse incisions in an endless belt, said apparatus comprising a rotatable support for an endless belt, an anvil for retaining the sides of a portion of the belt on said support, means for moving said support toward and away from the anvil, knives disposed on opposite sides of the support and movable transversely of the anvil when the belt is located therein to form a transverse incision in the belt by cuts directed from opposite sides of the belt, and means for rotating the support when the support is in position away from the anvil to advance the belt circumferentially relative to the knives to provide the required spacing between adjacent incisions in the belt.

2. Apparatus for forming substantially equally spaced, transverse incisions in an endless belt, said apparatus comprising a rotatable support for an endless belt, an anvil for retaining the sides of a portion of the belt on said support, knives disposed on opposite sides of the support and movable transversely of the anvil when the belt is located therein to form a transverse incision in the belt from opposite sides thereof, cam means for moving said supporting means away from the anvil to remove the belt therefrom following each cutting movement of said knives, and ratchet means for rotating said support when the support is in position away from the anvil to advance the belt endwise relative to the knives to provide the required spacing between adjacent incisions of the belt.

3. Apparatus for forming substantially equally spaced, transverse incisions in an endless V-belt, said apparatus comprising a rotatable support for an endless belt, an anvil for retaining the sides of a portion of the belt on said support, means for regulating the distance between said support and said anvil whereby a belt on said support is pressed against said anvil, a pair of knives disposed on each side of the mandrel opposite each other and slidably mounted for movement transversely of the anvil to form transverse incisions in the belt from opposite sides of the belt, the knives of each pair being spaced from each other a distance equal to three times the ultimate spacing between the desired incisions in the belt and operable on each of said slidable movements of said knives to form two lateral incisions in the belt a distance apart equal to three times the ultimate spacing between the incisions, cam means operable in sequence with said knives to move the support away from said anvil between successive movements of said knives, and means for rotating said support when the support is in position away from the anvil to advance the belt endwise relative to the knives a distance equal to twice the ultimate spacing between the incisions in the belt.

4. Apparatus for forming substantially equally spaced, transverse incisions in an endless V-belt, said apparatus comprising a mandrel for receiving an endless belt to be incised, a guide for slidably supporting the mandrel, knives disposed for movement transversely of a belt supported on the mandrel for cutting transverse incisions in the belt from opposite sides thereof, a first cam-operated mechanism for moving the knives intermittently against the belt, a second cam-operated mechanism for sliding the mandrel along the guideway away from the knives between successive cutting movements of the knives, and ratchet means for rotating the mandrel when the mandrel is in position away from the knives to advance the belt endwise relative to the knives.

5. Apparatus for notching an endless belt, said apparatus comprising a circular disc-like mandrel for receiving a belt in position to be processed, an anvil against which a portion of a belt on said mandrel is urged by the mandrel, cutting means oriented on axes disposed radially of the mandrel and movable transversely of the anvil against opposite sides of the belt to form a transverse incision through the belt, means for advancing the belt circumferentially relative to the anvil after said incision is formed, and means for moving the mandrel away from the anvil and the knives during the operation of said advancing means.

6. Apparatus for notching a belt, said apparatus comprising a circular disc-like mandrel for receiving a belt in position to be processed, an anvil against which a portion of a belt on said mandrel is urged by the mandrel, cutting means disposed transversely of the mandrel and movable transversely of the mandrel against opposite sides of a belt on said mandrel to form a transverse incision in said belt, means for separating the mandrel and the anvil to disengage the belt from the anvil between successive transverse movements of said cutting means, and means for rotating the mandrel to advance said belt endwise relative to the cutting means between successive transverse movements of said cutting means.

7. Apparatus for forming substantially equally spaced, transverse incisions in an endless article, said apparatus including means for supporting an article to be processed, an anvil to receive a portion of an article supported on said means, and cutting means movable transversely of the anvil and against the portion of the article engaged therewith to cut transversely through said article, the cutting means including a pair of parallel knives having cutting edges directed toward the article and the knives being spaced laterally apart a distance which is eqaul to three times the ultimately desired spacing between the incisions on the article, and means operable between successive cutting movements of the knives to advance the article endwise relative to the anvil and the knives a distance equal to twice the ultimate spacing between the incisions on the article until the full length of the article has been brought into cutting position adjacent the knives.

8. Apparatus for forming an even number of equally-spaced parallel transverse incisions in the peripheral face of an endless article, which apparatus comprises means for supporting the article, a pair of knives flanking each side of the article and disposed transversely of the article on said supporting means for simultaneously cutting a pair of transverse incisions in the article, the knives of one pair being aligned with the corresponding knives of the other pair on the opposite side of the article, means for advancing first one pair of knives against one side of the article and thereafter advancing the other pair of knives against the side of the article opposite the portion cut by the first pair of knives to form said pair of transverse incisions each pair of knives being spaced apart a distance equal to three times the ultimately desired spacing of the incisions on the peripheral face, and means for advancing the article lengthwise an indexing distance equal to twice the ultimate spacing between the incisions after each of said cutting movements until the full length of the article has been presented to the knives.

9. Apparatus for forming equally-spaced parallel transverse incisions in the peripheral face of an endless article, the apparatus comprising a rotatable member having a peripheral surface for supporting the article, a pair of knives on opposite sides of the member, each pair having cutting edges directed toward the article, the knives of each pair being spaced apart laterally a distance equal to three times the ultimate spacing of the incisions, means for bringing the pairs of knives against opposite sides of the article at periodic intervals to form pairs of transverse incisions in the article, means for moving the member diametrically to displace the article from between the knives after each cutting movement of the knives, and means for rotating said member when the article is so displaced after each cutting movement to advance the article lengthwise an indexing distance equal to twice the ultimate spacing of the incisions.

References Cited in the file of this patent

UNITED STATES PATENTS

| | | |
|---|---|---|
| 2,051,139 | Griffith | Aug. 18, 1936 |
| 2,101,458 | Sachtleben | Dec. 7, 1937 |
| 2,133,438 | Eger | Oct. 18, 1938 |
| 2,480,721 | Egenolf | Aug. 30, 1949 |
| 2,512,414 | Booth | June 20, 1950 |